United States Patent
Ushimi et al.

(10) Patent No.: US 11,945,928 B2
(45) Date of Patent: Apr. 2, 2024

(54) POLYOL COMPOSITION AND POLYURETHANE FOAM

(71) Applicant: SEKISUI CHEMICAL CO., LTD., Osaka (JP)

(72) Inventors: Takehiko Ushimi, Ibaraki (JP); Kazuhiro Okada, Shiraoka (JP); Masako Okamoto, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 505 days.

(21) Appl. No.: 17/278,412

(22) PCT Filed: Oct. 17, 2019

(86) PCT No.: PCT/JP2019/040963
§ 371 (c)(1),
(2) Date: Mar. 22, 2021

(87) PCT Pub. No.: WO2020/080485
PCT Pub. Date: Apr. 23, 2020

(65) Prior Publication Data
US 2021/0355292 A1 Nov. 18, 2021

(30) Foreign Application Priority Data
Oct. 18, 2018 (JP) .............................. 2018-197023

(51) Int. Cl.
*C08J 9/12* (2006.01)
*C08G 18/42* (2006.01)
*C08J 9/00* (2006.01)
*C08J 9/14* (2006.01)
*C08K 3/04* (2006.01)
*C08K 3/26* (2006.01)
*C08K 3/32* (2006.01)
*C08K 3/36* (2006.01)
*C08K 3/02* (2006.01)

(52) U.S. Cl.
CPC .......... *C08J 9/127* (2013.01); *C08G 18/4213* (2013.01); *C08J 9/0066* (2013.01); *C08J 9/125* (2013.01); *C08J 9/144* (2013.01); *C08K 3/04* (2013.01); *C08K 3/26* (2013.01); *C08K 3/32* (2013.01); *C08K 3/36* (2013.01); *C08J 2201/022* (2013.01); *C08J 2203/10* (2013.01); *C08J 2203/162* (2013.01); *C08J 2375/06* (2013.01); *C08K 2003/023* (2013.01); *C08K 2003/026* (2013.01); *C08K 2003/265* (2013.01); *C08K 2003/323* (2013.01); *C08K 2201/014* (2013.01)

(58) Field of Classification Search
CPC . C08J 9/127; C08J 9/0066; C08J 9/125; C08J 9/144; C08J 2201/022; C08J 2203/10; C08J 2203/162; C08J 2375/06; C08J 9/146; C08G 18/4213; C08G 2101/00; C08G 2110/00; C08G 18/092; C08G 2330/00; C08G 18/163; C08G 18/1808; C08G 18/2027; C08G 18/225; C08G 18/302; C08G 18/72; C08G 18/4211; C08K 3/04; C08K 3/26; C08K 3/32; C08K 3/36; C08K 2003/023; C08K 2003/026; C08K 2003/265; C08K 2003/323; C08K 2201/014; C08K 2003/2227; C08K 2003/2237; C08K 2003/2244; C08K 3/02; C08K 3/22; C08L 75/06
See application file for complete search history.

(56) References Cited

U.S. PATENT DOCUMENTS

| | | | |
|---|---|---|---|
| 4,407,982 A * | 10/1983 | Elgie .................... | C08J 9/0066 521/122 |
| 2005/0277724 A1 | 12/2005 | Pavlinac | |
| 2009/0099273 A1* | 4/2009 | Williams ........... | C08G 18/1816 521/126 |
| 2016/0251491 A1 | 9/2016 | Okada et al. | |

FOREIGN PATENT DOCUMENTS

| | | |
|---|---|---|
| EP | 1 600 466 | 11/2005 |
| JP | 5-331253 | 12/1993 |
| JP | 11-60669 | 3/1999 |
| JP | 2012-219127 | 11/2012 |
| WO | 2015/129850 | 9/2015 |

OTHER PUBLICATIONS

International Search Report (ISR) dated Jan. 21, 2020 in International (PCT) Application No. PCT/JP2019/040963.

* cited by examiner

*Primary Examiner* — Irina S Zemel
(74) *Attorney, Agent, or Firm* — Wenderoth, Lind & Ponack, L.L.P.

(57) ABSTRACT

Provided are a polyol composition in which hard caking does not occur when stored for a long period of time, and a polyurethane foam using the same.
The polyol composition comprises a polyol compound, a foaming agent, a filler, and a metal oxide fine particle, the foaming agent including a hydrofluoroolefin, and the metal oxide fine particle having a count number ratio of OH ions of a metal constituting the metal oxide fine particle with respect to a total count number of all ions measured using time-of-flight secondary ion mass spectrometry of 0.1 or less.

14 Claims, No Drawings

POLYOL COMPOSITION AND POLYURETHANE FOAM

TECHNICAL FIELD

The present invention relates to a polyol composition and a polyurethane foam.

BACKGROUND ART

Concrete reinforced with reinforcing bars and the like is used as a structural material in outer walls of apartment houses such as condominiums, detached houses, various school facilities, and commercial buildings, to increase the strength of the building.

On the other hand, since concrete has properties of storing heat storage and cold, concrete has a disadvantage in that the inside of the building is heated by the heat accumulated in the summer, and the inside of the building is cooled as a result of the concrete being cooled during the cold winter season. In order to reduce this extended influence of the outside temperature on the inside of the building via the concrete, heat insulating processing may be performed on the concrete by providing a heat insulating layer or the like.

As the heat insulating layer, rigid polyurethane foam having fire retardancy against fire is widely used. As disclosed in Patent Literature 1, in a rigid polyurethane foam having fire retardancy, it is known to use an anti-sedimentation agent in addition to a flame retardant such as red phosphorus.

CITATION LIST

Patent Literature

PTL1: JP 2012-219127 A

SUMMARY OF INVENTION

Technical Problem

However, even when an anti-sedimentation agent is used, in the polyol composition, so-called hard caking in which the filler sediments and solidifies to the extent that it cannot be re-stirred can occur during long-term storage of, for example, one month or more.

Therefore, an object of the present invention is to provide a polyol composition that can be used by re-stirring without causing hard caking even after long-term storage, and a polyurethane foam using the same.

Solution to Problem

The present inventors have discovered that when a hydrofluoroolefin is used as a foaming agent included in a polyol composition for producing a polyurethane foam, adding a metal oxide fine particle having specific physical properties to the polyol composition prevents hard caking from occurring for a long time in the polyol composition, to thereby complete the following inventions.

The present invention provides the following polyol composition and a polyurethane foam using the same.

[1] A polyol composition comprising a polyol compound, a foaming agent, a filler, and a metal oxide fine particle, the foaming agent including a hydrofluoroolefin, and the metal oxide fine particle having a count number ratio of OH ions of a metal constituting the metal oxide fine particle with respect to a total count number of all ions measured using time-of-flight secondary ion mass spectrometry of 0.1 or less.

[2] The polyol composition according to [1], comprising at least one selected from the group consisting of a catalyst and a foam stabilizing agent.

[3] The polyol composition according to [1] or [2], wherein the filler includes a powder flame retardant.

[4] The polyol composition according to any one of [1] to [3], wherein the filler includes an inorganic filler.

[5] The polyol composition according to any one of [1] to [4], wherein the filler includes a pigment.

[6] The polyol composition according to any one of [1] to [5], wherein a metal portion of the metal oxide fine particle is at least one selected from the group consisting of aluminum, titanium, zirconium, and silicon.

[7] The polyol composition according to any one of [1] to [6], wherein the metal portion of the metal oxide fine particle is silicon.

[8] A polyurethane foam, which is a reaction product of the polyol composition according to any one of [1] to [7] and a polyisocyanate.

Advantageous Effects of Invention

A polyol composition of the present invention can be used by re-stirring without hard caking occurring even after storage for a long period of time.

DESCRIPTION OF EMBODIMENTS

[Polyol Composition]

The polyol composition of the present invention comprises a polyol compound, a foaming agent including a hydrofluoroolefin, a filler, and a metal oxide fine particle. In the present invention, the metal oxide fine particle has a count number ratio of OH ions (hereinafter, also simply referred to as "OH ratio") of a metal constituting the metal oxide fine particle with respect to a total count number of all ions measured using time-of-flight secondary ion mass spectrometry (TOF-SIMS) of 0.1 or less.

Polyol compositions can undergo caking, in which the filler sediments and solidifies during long-term storage. However, in the present invention, by using a hydrofluoroolefin as a foaming agent and blending a metal oxide fine particle having an OH ratio of 0.1 or less, caking does not occur and the polyol composition can be used by re-stirring even after long-term storage.

The polyol composition of the present invention can be mixed with a polyisocyanate and cured to obtain a polyurethane. In the following description, a composition that includes a polyol composition and a polyisocyanate and that has been cured to turn into a polyurethane may be described as a polyurethane composition. The polyurethane is usually a polyurethane foam.

(Polyol Compound)

Specific examples of the polyol compound included in the polyol composition of the present invention include a polylactone polyol, a polycarbonate polyol, an aromatic polyol, an alicyclic polyol, an aliphatic polyol, a polyester polyol, a polymer polyol, a polyether polyol, and the like.

Specific examples of the polylactone polyol include polypropiolactone glycol, polycaprolactone glycol, polyvalerolactone glycol, and the like.

Specific examples of the polycarbonate polyol include a polyol obtained by a dealcoholization reaction between a hydroxyl group-containing compound, such as ethylene glycol, propylene glycol, butanediol, pentanediol, hexanediol, octanediol, and nonanediol, and diethylene carbonate, dipropylene carbonate, and the like.

Specific examples of the aromatic polyol include bisphenol A, bisphenol F, phenol novolac, cresol novolac, and the like.

Specific examples of the alicyclic polyol include cyclohexanediol, methylcyclohexanediol, isophoronediol, dicyclohexylmethanediol, dimethyldicyclohexylmethanediol, and the like.

Specific examples of the aliphatic polyol include ethylene glycol, propylene glycol, butanediol, pentanediol, hexanediol, and the like.

Specific examples of the polyester polyol include a polymer obtained by dehydration condensation of a polybasic acid and a polyhydric alcohol, a polymer obtained by ring-opening polymerization of a lactone such as ε-caprolactone and α-methyl-ε-caprolactone, and a condensate of hydroxycarboxylic acid and the above-described polyhydric alcohol or the like.

Here, specific examples of the polybasic acid include adipic acid, azelaic acid, sebacic acid, terephthalic acid, isophthalic acid, succinic acid, and the like. Further, specific examples of the polyhydric alcohol include bisphenol A, ethylene glycol, 1,2-propylene glycol, 1,4-butanediol, diethylene glycol, 1,6-hexane glycol, neopentyl glycol, and the like.

Specific examples of the hydroxycarboxylic acid include castor oil, a reaction product of castor oil and ethylene glycol, and the like.

Specific examples of the polymer polyol include a polymer obtained by graft-polymerizing an ethylenically unsaturated compound such as acrylonitrile, styrene, methyl acrylate, and methacrylate with an aromatic polyol, an alicyclic polyol, an aliphatic polyol, a polyester polyol, or the like, a polybutadiene polyol, a modified polyol of a polyhydric alcohol, a hydrogenated additive thereof, or the like.

Specific examples of the modified polyol of a polyhydric alcohol include a polyol modified by reacting the raw material polyhydric alcohol with an alkylene oxide, and the like.

Specific examples of the polyhydric alcohol include a trihydric alcohol such as glycerin and trimethylolpropane, tetra to octavalent alcohols such as pentaerythritol, sorbitol, mannitol, sorbitan, diglycerin, dip entaerythritol, sucrose, glucose, mannose, fructose, methylglucoside, derivatives of these, and the like, a hydroxyl group-containing aromatic compound such as fluoroglucin, pyrogallol, catechol, hydroquinone, bisphenol A, bisphenol F, bisphenol S, 1,3,6,8-tetrahydroxynaphthalene, 1,4,5,8-tetrahydroxyanthracene, and 1-hydroxypyrene, a polyfunctional (for example, 2 to 100 functional groups) polyol such as castor oil polyol, a (co)polymer of hydroxyalkyl (meth)acrylate and a polyvinyl alcohol, a condensate of a phenol and formaldehyde (Novolak), and the like.

The method for modifying the polyhydric alcohol is not particularly limited, and a method for adding an alkylene oxide (hereinafter, abbreviated as "AO") can be preferably used.

Specific examples of the AO include an AO having 2 to 6 carbon atoms, for example, ethylene oxide (hereinafter, abbreviated as "EO"), 1,2-propylene oxide (hereinafter, abbreviated as "PO"), 1,3-propylene oxide, 1,2-butylene oxide, 1,4-butylene oxide, and the like.

Among these, from the viewpoint of properties and reactivity, PO, EO, and 1,2-butylene oxide are preferable, and PO and EO are more preferable. When two or more kinds of AO are used (for example, PO and EO), the addition method may be block addition, random addition, or a combination of these.

Specific examples of the polyether polymer include a polymer obtained by subjecting at least one kind of alkylene oxide, such as ethylene oxide, propylene oxide, and tetrahydrofuran, to ring-opening polymerization in the presence of at least one kind of low-molecular-weight active hydrogen compound having two or more active hydrogens and the like.

Specific examples of the low-molecular-weight active hydrogen compound having two or more active hydrogens include a diol such as bisphenol A, ethylene glycol, propylene glycol, butylene glycol, and 1,6-hexanediol, a triol such as glycerin and trimethylolpropane, an amine such as ethylenediamine and butylene diamine, and the like.

Since the polyol used in the present invention has a large effect of reducing the total calorific value when burned, a polyester polyol or a polyether polyol is preferably used.

Among them, a polyester polyol having a molecular weight of 200 to 800 is more preferably used, and a polyester polyol having a molecular weight of 300 to 500 is particularly preferably used.

(Foaming Agent)

The polyol composition of the present invention includes a hydrofluoroolefin as a foaming agent. Examples of the hydrofluoroolefin include fluoroalkenes having about 3 to 6 carbon atoms. Further, the hydrofluoroolefin may be a hydrochlorofluoroolefin having a chlorine atom, and therefore may be a chlorofluoroalkene or the like having about 3 to 6 carbon atoms. From viewpoints such as a foaming property and a handling property, the hydrofluoroolefin preferably has 3 or 4 carbon atoms, and more preferably 3 carbon atoms.

Specifically, examples include trifluoropropene, a tetrafluoropropene such as HFO-1234, a pentafluoropropene such as HFO-1225, a chlorotrifluoropropene such as HFO-1233, chlorodifluoropropene, chlorotrifluoropropene, chlorotetrafluoropropene, and the like. More specifically, examples include 1,3,3,3-tetrafluoropropene (HFO-1234ze), 1,1,3,3-tetrafluoropropene, 1,2,3,3,3-pentafluoropropene (HFO-1225ye), 1,1,1-trifluoropropene, 1,1,1,3,3-pentafluoropropene (HFO-1225zc), 1,1,1,3,3,3-hexafluorobut-2-ene, 1,1,2,3,3-pentafluoropropene (HFO-1225yc), 1,1,1,2,3-pentafluoropropene (HFO-1225yez), 1-chloro-3,3,3-trifluoropropene (HFO-1233zd), 1,1,1,4,4,4-hexafluorobut-2-ene, and the like. Of these, 1-chloro-3,3,3-trifluoropropene (HFO-1233zd) is preferable, and trans-1-chloro-3,3,3-trifluoropropene is more preferable.

These hydrofluoroolefins may be used singly or in combination of two or more thereof.

The amount of the hydrofluoroolefin blended is preferably 10 to 60 parts by mass, more preferably 20 to 55 parts by mass, and further preferably 25 to 50 parts by mass, with respect to 100 parts by mass of the polyol compound. When the amount of the hydrofluoroolefin blended is equal to or more than these lower limit values, foaming is promoted and the density of the obtained polyurethane foam can be reduced. On the other hand, when the amount of the hydrofluoroolefin blended is equal to or less than these upper limit values, promotion of excessive foaming can be suppressed. Further, by setting the amount blended to be within these ranges, it is easier to prevent the occurrence of casing by using together with the metal oxide fine particle, which is described later.

The polyol composition of the present invention may comprise a foaming agent other than a hydrofluoroolefin. As the foaming agent other than a hydrofluoroolefin, water is preferable from the viewpoint of adjusting an isocyanate index described later and from the viewpoint of ease of handling.

The amount of water blended is not particularly limited, and is preferably 0.1 to 10 parts by mass, more preferably 0.3 to 6 parts by mass, and further preferably 0.5 to 3 parts by mass, with respect to 100 parts by mass of the polyol compound.

The total amount of the foaming agent blended is preferably 10 to 65 parts by mass, more preferably 20 to 57 parts by mass, and further preferably 25 to 52 parts by mass, with respect to 100 parts by mass of the polyol compound.

A content ratio of the total amount of the foaming agent is preferably in a range of 0.1 to 30% by mass, more preferably in a range of 0.1 to 18% by mass, further preferably in a range of 0.5 to 18% by mass, and most preferably in a range of 1 to 10% by mass, with respect to the total amount of the polyurethane composition.

(Filler)

The polyol composition of the present invention includes a filler. Specific examples of the filler include a pigment, a powder flame retardant, and an inorganic filler. A commercially available product may be appropriately selected and used for the filler.

<Pigment>

The pigment is not particularly limited, and any one of an inorganic pigment and an organic pigment can be used. Specific examples of the pigment include a white pigment such as titanium oxide, a black pigment such as carbon black, graphite, and iron black, a blue pigment such as dark blue, ultramarine blue, cobalt blue, copper phthalocyanine blue, and indanthrone blue, a yellow pigment such as synthetic yellow iron oxide, transparent red iron oxide (yellow), bismuth vanadate, titanium yellow, monoazo yellow, disazo yellow, isoindolinone yellow, metal complex salt azo yellow, quinophthalone yellow, and benzimidazolone yellow, a red pigment such as bengara, transparent bengara (red), monoazo red, unsubstituted quinacridone red, azo lake (Mn salt), quinacridone magenta, anthanthrone orange, dianthraquinonyl red, perylene maroon, perylene red, and diketopyrrolopyrrole chrome vermilion, a green pigment such as chlorinated phthalocyanine green and brominated phthalocyanine green, and other pigments such as pyrazolone orange, benzimidazolone orange, dioxazine violet, and perylene violet. These pigments can be used singly or in combination of two or more thereof.

The amount of the pigment blended is preferably in a range of 1 to 100 parts by mass, more preferably in a range of 10 to 80 parts by mass, further preferably in a range of 20 to 70 parts by mass, and most preferably in a range of 30 to 60 parts by mass, with respect to 100 parts by mass of the polyol compound.

A content ratio of the pigment used in the present invention is preferably 1 to 45% by mass, more preferably 1.5 to 40% by mass, further preferably 2 to 35% by mass, and most preferably 4.5 to 30% by mass, with respect to the total amount of the polyurethane composition.

<Powder Flame Retardant>

The polyol composition of the present invention preferably contains, as a powder flame retardant, one or more selected from the group consisting of a red phosphorus flame retardant, a boron-containing flame retardant, an acicular filler, a phosphorus acid salt-containing flame retardant, a bromine-containing flame retardant, a nitrogen flame retardant, an antimony-containing flame retardant, and a metal hydroxide. The powder flame retardant is a flame retardant that is a solid at normal temperature (23° C.) and normal pressure (1 atm), and is present as a powder (solid) without dissolving in the polyol composition.

The red phosphorus flame retardant used in the present invention may be composed of red phosphorus alone, but may also be red phosphorus coated on a resin, a metal hydroxide, a metal oxide, or the like, or may be a mixture of red phosphorus with a resin, a metal hydroxide, a metal oxide or the like. The resin that may be coated with red phosphorus or mixed with red phosphorus is not particularly limited, and examples thereof include thermosetting resins such as a phenol resin, an epoxy resin, an unsaturated polyester resin, a melamine resin, a urea resin, an aniline resin, a silicone resin, and the like. As the compound to be coated or mixed, a metal hydroxide is preferable from the viewpoint of fire retardancy. The metal hydroxide may be appropriately selected and used from among those described later.

When a red phosphorus flame retardant is used as the filler, the amount of the red phosphorus flame retardant blended is preferably in a range of 1 to 100 parts by mass, more preferably in a range of 10 to 80 parts by mass, further preferably in a range of 20 to 70 parts by mass, and most preferably in a range of 30 to 60 parts by mass, with respect to 100 parts by mass of the polyol compound.

Specific examples of the boron-containing flame retardant include borax, a boron oxide, boric acid, a borate, and the like.

Specific examples of the boron oxide include diboron trioxide, boron trioxide, diboron dioxide, tetraboron trioxide, tetraboron pentoxide, and the like.

Specific examples of the borate include an alkali metal, an alkaline earth metal, an element of Groups 4, 12, and 13 of the Periodic Table, and an ammonium borate. Specifically, examples include an alkali metal borate salt such as lithium borate, sodium borate, potassium borate, and cesium borate, an alkaline earth metal borate salt such as magnesium borate, calcium borate, and barium borate, zirconium borate, aluminum borate, and ammonium borate. A preferable boron-containing flame retardant is a borate.

The boron-containing flame retardants may be used singly or in combination of two or more thereof.

When a boron-containing flame retardant is used as the filler, the amount of the boron-containing flame retardant blended is preferably in a range of 1 to 100 parts by mass, more preferably a range of 10 to 80 parts by mass, further preferably a range of 20 to 70 parts by mass, and most preferably a range of 30 to 60 parts by mass, with respect to 100 parts by mass of the polyol compound.

The acicular filler may be an organic filler or an inorganic filler, but is preferably an inorganic filler. The acicular filler has an aspect ratio of 5 to 50, preferably 8 to 40, more preferably 10 to 40, particularly preferably 10 to 35, and most preferably 8 to 25. As used in the present specification, the aspect ratio of the filler is the ratio of the maximum length of the filler confirmed in an image obtained by observing the acicular filler with a scanning electron microscope to the minimum thickness (in the direction perpendicular to the maximum length) (also referred to as diameter/thickness ratio), and is obtained as the average of 250 or more acicular filler particles.

The acicular filler has an average particle size of 0.1 μm or more and less than 15 μm, preferably 0.1 μm or more and 14 μm or less, and more preferably 0.3 to 10 μm. The average particle size is determined by an X-ray transmission type sedimentation method particle size distribution measuring device. The acicular filler has a melting point of 750° C. or more, preferably 800° C. or more, and more preferably 1,000° C. or more.

Specific examples of an acicular inorganic filler include basic magnesium sulfate, aluminum borate, wollastonite (silicite), zonotrite, dosonite, elestadite, boehmite, rod-like hydroxyapatite, potassium titanate whisker, aluminum borate whisker, magnesium whisker, silicon whisker, acicular alumina, acicular ceramic, asbestos, acicular calcium carbonate, gypsum fiber, glass fiber, asbestos fiber, silica fiber, alumina fiber, silica/alumina fiber, zirconia fiber, carbon fiber (including fibrous form such as carbon nanotube and spherical new carbon such as acicular or fullerene), graphite fiber, boron nitride fiber, boron fiber, metal fiber, and the like.

The acicular filler prevents the polyurethane foam from at least one of shrinkage and deformation. In the present specification, "shrinkage" refers to a change in length, including a change in length in the length direction, length in the width direction, and length in the thickness direction, and "deformation" refers to a change in shape, such as warpage. In particular, "deformation" refers to a change in shape in the thickness direction. The term acicular refers to a shape having a major axis that is three times or more the minor axis, and includes not only a so-called needle shape but also a spindle shape, a cylindrical shape, and the like.

In one preferred embodiment, the acicular filler is an acicular inorganic filler having an aspect ratio of 5 to 50 and an average particle size of 0.1 μm or more and less than 15 μm. A preferable acicular filler is wollastonite or potassium titanate whisker.

When an acicular filler is used as the filler, the amount of the acicular filler blended is preferably in a range of 1 to 100 parts by mass, more preferably in a range of 10 to 80 parts by mass, further preferably in a range of 20 to 70 parts by mass, and most preferably 30 to 60 parts by mass, with respect to 100 parts by mass of the polyol compound.

Specific examples of the phosphorus acid salt-containing flame retardant include phosphorus acid salt composed of a salt of various phosphorus acids and at least one metal or compound selected from metals of Groups IA to IVB of the Periodic Table, ammonia, an aliphatic amine, and an aromatic amine. Examples of the metals of Groups IA to IVB of the Periodic Table include lithium, sodium, calcium, barium, iron(II), iron(III), aluminum, and the like.

Specific examples of the aliphatic amine include methylamine, ethylamine, diethylamine, triethylamine, ethylenediamine, piperazine, and the like.

Specific examples of the aromatic amine include pyridine, triazine, melamine, and the like.

The phosphorus acid salt-containing flame retardant may be subjected to a known water resistance improving treatment, such as treating with a silane coupling agent or coating with a melamine resin. In addition, a known foaming aid such as melamine or pentaerythritol may be added to the mixture for producing a polyurethane foam.

Specific examples of the phosphorus acid salt-containing flame retardant include a mono-phosphorus acid salt, a pyro-phosphorus acid salt, a poly-phosphorus acid salt, and the like.

Specific examples of the mono-phosphorus acid salt include an ammonium salt such as ammonium phosphate, ammonium dihydrogen phosphate, and diammonium hydrogen phosphate, a sodium salt such as monosodium phosphate, disodium phosphate, trisodium phosphate, monosodium phosphate, disodium phosphite, and sodium hypophosphite, a potassium salt such as monopotassium phosphate, dipotassium phosphate, tripotassium phosphate, monopotassium phosphite, dipotassium phosphite, and potassium hypophosphite, a lithium salt such as monolithium phosphate, dilithium phosphate, trilithium phosphate, monolithium phosphite, dilithium phosphite, and lithium hypophosphite, a barium salt such as barium dihydrogen phosphate, barium hydrogen phosphate, tribarium phosphate, and barium hypophosphite, a magnesium salt such as magnesium monohydrogen phosphate, magnesium hydrogen phosphate, trimagnesium phosphate, and magnesium hypophosphite, a calcium salt such as calcium dihydrogen phosphate, calcium hydrogen phosphate, tricalcium phosphate, calcium hypophosphite, and the like.

Specific examples of the poly-phosphorus acid salt include ammonium polyphosphate, piperazine polyphosphate, melamine polyphosphate, ammonium polyphosphate amide, aluminum polyphosphate, and the like.

The phosphorus acid salt-containing flame retardants may be used singly or in combination of two or more thereof.

When a phosphorus acid salt-containing flame retardant is used as the filler, the amount of the phosphorus acid salt-containing flame retardant blended is preferably in a range of 1 to 100 parts by mass, more preferably in a range of 10 to 80 parts by mass, further preferably in a range of 20 to 70 parts by mass, and most preferably in a range of 30 to 60 parts by mass, with respect to 100 parts by mass of the polyol compound.

The bromine-containing flame retardant is not particularly limited as long as it is a compound containing bromine in its molecular structure. Specific examples of the bromine-containing flame retardant include an aromatic brominated compound and the like.

Specific examples of the aromatic brominated compound include a monomer-based organic bromine compound such as hexabromobenzene, pentabromotoluene, hexabromobiphenyl, decabromobiphenyl, decabromodiphenyl ether, octabromodiphenyl ether, hexabromodiphenyl ether, bis(pentabromophenoxy)ethane, ethylenebis(pentabromophenyl), ethylenebis(tetrabromophthalimide), and tetrabromobisphenol A.

Further, the brominated aromatic ring-containing aromatic compound may be a bromine compound polymer. Specifically, examples include a polycarbonate oligomer produced from brominated bisphenol A as a raw material, a brominated polycarbonate of a copolymer and the like of this polycarbonate oligomer and bisphenol A, a diepoxy compound produced by a reaction between brominated bisphenol A and epichlorohydrin, and the like. Further examples include a brominated epoxy compound such as a monoepoxy compound obtained by a reaction between a brominated phenol and epichlorohydrin, poly(brominated benzyl acrylate), a condensate of a brominated polyphenylene ether, a brominated bisphenol A, and a brominated phenol of cyanuric chloride, a brominated(polystyrene), a poly(brominated styrene), a brominated polystyrene such as a crosslinked brominated polystyrene, and a crosslinked or non-crosslinked brominated poly(-methylstyrene).

Further, the bromine-containing flame retardant may be a compound other than a brominated aromatic ring-containing aromatic compound, such as hexabromocyclododecane.

From the viewpoint of controlling the calorific value at the initial stage of combustion, brominated (polystyrene), hexabromobenzene and the like are preferable, and hexabromobenzene is more preferable. The bromine-containing flame retardants may be used singly or in combination of two or more thereof.

When a bromine-containing flame retardant is used as the filler, the amount of the bromine-containing flame retardant blended is preferably in a range of 1 to 100 parts by mass, more preferably in a range of 10 to 80 parts by mass, further preferably in a range of 20 to 70 parts by mass, and most preferably in a range of 30 to 60 parts by mass, with respect to 100 parts by mass of the polyol compound.

Specific examples of the nitrogen flame retardant include melamine, a melamine derivative such as butyl melamine, trimethylol melamine, hexamethylol melamine, hexamethoxymethyl melamine, and melamine phosphate, cyanuric acid, a cyanuric acid derivative such as methyl cyanurate, diethyl cyanurate, trimethyl cyanurate, triethyl cyanurate, isocyanuric acid, an isocyanuric acid derivative such as methyl isocyanurate, N,N'-diethyl isocyanurate, trismethyl isocyanurate, trisethyl isocyanurate, bis(2-carboxyethyl) isocyanurate, 1,3,5-tris(2-carboxyethyl) isocyanurate, and tris(2,3-epoxypropyl) isocyanurate, melamine cyanurate, melamine isocyanurate, ammonium carbonate, and the like.

The nitrogen flame retardants may be used singly or in combination of two or more thereof.

When a nitrogen flame retardant is used as the filler, the amount of the nitrogen flame retardant blended is preferably in a range of 1 to 100 parts by mass, more preferably in a range of 10 to 80 parts by mass, further preferably in a range of 20 to 70 parts by mass, and most preferably in a range of 30 to 60 parts by mass, with respect to 100 parts by mass of the polyol compound.

Specific examples of the antimony-containing flame retardant include an antimony oxide, an antimonate, a pyroantimonate, and the like.

Specific examples of the antimony oxide include antimony trioxide, antimony pentoxide, and the like. Specific examples of the antimonate include sodium antimonate, potassium antimonate, and the like. Specific examples of the pyroantimonate include sodium pyroantimonate, potassium pyroantimonate, and the like. A preferable antimony-containing flame retardant is an antimony oxide.

The antimony-containing flame retardants may be used singly or in combination of two or more thereof.

When an antimony-containing flame retardant is used as the filler, the amount of the antimony-containing flame retardant blended is preferably in a range of 1 to 100 parts by mass, more preferably in a range of 10 to 80 parts by mass, further preferably in a range of 20 to 70 parts by mass, and most preferably in a range of 30 to 60 parts by mass, with respect to 100 parts by mass of the polyol compound.

Specific examples of the metal hydroxide used in the present invention include magnesium hydroxide, calcium hydroxide, aluminum hydroxide, iron hydroxide, nickel hydroxide, zirconium hydroxide, titanium hydroxide, copper hydroxide, vanadium hydroxide, tin hydroxide, and the like.

The metal hydroxides may be used singly or in combination of two or more thereof.

When a metal hydroxide is used as the filler, the amount of the metal hydroxide blended is preferably in a range of 1 to 100 parts by mass, more preferably in a range of 10 to 80 parts by mass, further preferably in a range of 20 to 70 parts by mass, and most preferably in a range of 30 to 60 parts by mass, with respect to 100 parts by mass of the polyol compound.

When the filler includes a powder flame retardant, the amount of the powder flame retardant blended is preferably in a range of 1 to 150 parts by mass, more preferably in a range of 10 to 120 parts by mass, further preferably in a range of 20 to 100 parts by mass, and most preferably in a range of 30 to 60 parts by mass, with respect to 100 parts by mass of the polyol compound. When the powder flame retardant is within the above ranges, it is possible to prevent a dense residue in a formed article formed by the heat of a fire from cracking, and the foaming of the composition is not hindered.

The content ratio of the powder flame retardant is preferably 1 to 60% by mass, more preferably 2 to 50% by mass, further preferably 5 to 40% by mass, and most preferably 10 to 30% by mass, with respect to the total amount of the polyurethane composition.

<Inorganic Filler>

As the inorganic filler, a material other than the above-described powder flame retardant and pigment is used. Specific examples of the inorganic filler include a ferrite, basic magnesium carbonate, calcium carbonate, magnesium carbonate, barium carbonate, dosonite, hydrotalcite, calcium sulfate, barium sulfate, gypsum fiber, a potassium salt such as calcium silicate, talc, clay, mica, montmorillonite, bentonite, active white clay, sepiolite, imogolite, cericite, glass fiber, glass beads, aluminum nitride, boron nitride, silicon nitride, carbon fiber, carbon balloon, charcoal powder, various metal powders, potassium titanate, magnesium sulfate, lead zirconate titanate, aluminum borate, molybdenum sulfide, silicon carbide, stainless fiber, various magnetic powders, slag fibers, fly ash, silica-alumina fiber, alumina fiber, silica fiber, zirconia fiber, and the like. The inorganic fillers may be used singly or in combination of two or more thereof.

The amount of the inorganic filler blended in the polyol composition of the present invention is preferably in a range of 1 to 100 parts by mass, more preferably in a range of 5 to 80 parts by mass, further preferably in a range of 10 to 70 parts by mass, and most preferably in a range of 20 to 60 parts by mass, with respect to 100 parts by mass of the polyol compound.

The content ratio of the inorganic filler is preferably 1 to 45% by mass, more preferably 2 to 40% by mass, further preferably 5 to 35% by mass, and most preferably 10 to 30% by mass, with respect to the total amount of the polyurethane composition.

In the present invention, as the filler, one kind from the examples described above may be used alone, or two or more kinds may be used. The amount of all the fillers contained in the polyol composition blended of the present invention is preferably in a range of 10 to 200 parts by mass, more preferably in a range of 20 to 120 parts by mass, further preferably in a range of 25 to 90 parts by mass, and most preferably 30 to 70 parts by mass, with respect to 100 parts by mass of the polyol compound. By setting to within these ranges, hard caking that occurs during long-term storage can be effectively reduced by the metal oxide fine particle.

(Metal Oxide Fine Particle)

The polyol composition of the present invention includes a metal oxide fine particle. The metal oxide fine particle functions as an anti-sedimentation agent that prevents sedimentation of the above-described filler. The metal oxide fine particle has a count number ratio of OH ions (OH ratio) of the metal constituting the metal oxide with respect to a total count number of all ions measured using time-of-flight secondary ion mass spectrometry of 0.1 or less. If the OH ratio is more than 0.1, caking occurs in the polyol composition during long-term storage, the polyol composition is unusable even after re-stirring.

A preferable OH ratio is 0.09 or less, and a more preferable OH ratio is 0.08 or less. When the OH ratio is equal to or less than these upper limit values, the occurrence of caking can be suppressed more effectively. The lower limit values of the OH ratio is not particularly limited, and may be 0 or more, but from the viewpoint of suppressing an increase in viscosity due to the metal oxide fine particle, 0.02 or more is preferable, and 0.05 or more is more preferable.

The metal oxide fine particle is not limited to a specific particle as long as the OH ratio is 0.1 or less. In the metal oxide fine particle, the metal portion is, for example, aluminum, titanium, zirconium, or silicon, and is preferably silicon. Specific examples of the metal oxide fine particle include a silicon oxide, an aluminum oxide, a titanium oxide, and a zirconium oxide, and a preferred metal oxide fine particle is a silicon oxide fine particle.

When the metal oxide fine particle is silicon oxide fine particle whose metal portion is composed of silicon, the OH ion is a SiOH ion. Therefore, in such a case, as shown in the Examples described later, the total count number of all ions and the count number of SiOH ions are determined, and the OH ratio (SiOH ratio) may be calculated from the ratio between them.

Similarly, for a metal oxide fine particle whose metal portion is composed of aluminum, the OH ion is $Al(OH)_3$. Therefore, in such a case, the total count number of all ions and the count number of $Al(OH)_3$ ions are determined, and the OH ratio may be calculated from the ratio between them.

Further, for a metal oxide fine particle whose metal portion is composed of titanium, the OH ion is TiOH ion. Therefore, in such a case, the total count number of all ions and the count number of TiOH ions are determined, and the OH ratio may be calculated from the ratio between them.

In addition, for a metal oxide fine particle whose metal portion is composed of zirconium, the OH ion is ZrOH ion. Therefore, in such a case, the total count number of all ions and the count number of ZrOH ions are determined, and the OH ratio may be calculated from the ratio between them.

Moreover, for a metal oxide fine particle whose metal portion is composed of two or more kinds, the total count number of all ions and the count number of the OH ions of the two or more kinds of metal are determined, and the OH ratio may be calculated from the ratio between them.

TOF-SIMS (Time-of-Flight Secondary Ion Mass Spectrometry) is an analytical method that enables almost non-destructive analysis to be performed in which a solid sample is irradiated with an ion beam (primary ion), and mass spectrometry is performed using a flight time difference of the ion (secondary ion) emitted from the surface (flight time is proportional to the square root of the weight). With TOF-SIMS, information on the elements or molecular species existing to a depth of 1 nm or less from the sample surface can be obtained with extremely high detection sensitivity.

The method for setting the OH ratio to be not more than 0.1 is not particularly limited. Examples of the method include hydrophobizing the surface of the metal oxide fine particle. The hydrophobizing treatment is carried out according to a conventional method. Specific examples of the hydrophobizing treatment include a method of hydrophobizing the hydroxyl group of a hydrophilic metal oxide fine particle having a hydroxyl group on the surface with a hydrophobizing agent.

Examples of the hydrophobizing agent include a monochlorosilane such as chlorotrimethylsilane, a dichlorosilane such as dichlorodimethylsilane, an alkylsilane such as octylsilane, a silicone oil such as dimethylpolysiloxane, hexamethyldisilazane, aminoalkylsilane, methacrylsilane, and the like. Further, a hydrophobizing treatment may be performed using both a hydrophilizing agent and a hydrophobizing agent.

A hydrophobic group such as an alkylsilane, for example dimethylsilyl, trimethylsilyl, dimethylpolysiloxane, aminoalkylsilyl, methacrylsilyl, and octylsilyl, may be introduced onto the surface of metal oxide fine particle by a hydrophobizing treatment. Of these, dimethylsilyl and trimethylsilyl are preferable. Further, a hydrophilic group such as an amino group may also be introduced.

The metal oxide fine particle has an average primary particle size of preferably 3 nm to 60 nm, more preferably 5 nm to 50 nm, and further preferably 5 nm to 40 nm. The average primary particle size may be measured with a transmission electron microscope.

The metal oxide fine particle has a specific surface area of preferably 100 to 500 $m^2/g$, more preferably 150 to 400 $m^2/g$, and particularly preferably 200 to 350 $m^2/g$. The specific surface area is measured by a BET method.

The metal oxide fine particle has a water absorption amount of preferably 1.0% by mass or less, more preferably 0.5% by mass or less, and particularly preferably 0.2% by mass or less. When the water absorption amount of the metal oxide fine particle is lower, the occurrence of hard caking can be prevented more effectively. The amount of water absorbed by the metal oxide fine particle generally decreases as the OH ratio is reduced. The lower limit of the water absorption amount is not particularly limited, and may be 0% by mass or more. The method for measuring the water absorption amount is as described in Examples described later.

The amount of the metal oxide fine particle blended is preferably in a range of 0.5 to 10 parts by mass, more preferably in a range of 1 to 8 parts by mass, further preferably in a range of 1 to 6 parts by mass, and particularly preferably in a range of 1.5 to 4 parts by mass, with respect to 100 parts by mass of the polyol compound. By setting the amount of the metal oxide fine particle blended to be within the above ranges, the occurrence of caking can be effectively suppressed.

The content ratio of the metal oxide fine particle is preferably 0.1 to 5% by mass, more preferably 0.3 to 4% by mass, further preferably 0.5 to 3% by mass, and most preferably 0.5 to 2% by mass, with respect to the total amount of the polyurethane composition.

The polyol composition of the present invention preferably further contains either a catalyst or a foam stabilizing agent, and more preferably contains both a catalyst and a foam stabilizing agent.

(Catalyst)

Specific examples of the catalyst include a trimerization catalyst and a urethane catalyst (resinification catalyst, foaming catalyst). The trimerization catalyst reacts isocyanates with each other to catalyze the formation of an isocyanurate.

<Trimerization Catalyst>

Specific examples of the trimerization catalyst include a nitrogen-containing aromatic compound such as tris(dimethylaminomethyl)phenol, 2,4-bis(dimethylaminomethyl)phenol, and 2,4,6-tris(dialkylaminoalkyl)hexahydro-S-triazine, a carboxylic acid alkali metal salt such as potassium acetate, potassium 2-ethylhexanoate, and potassium octylate, a tertiary ammonium salt such as a trimethylammonium salt, a triethylammonium salt, and a triphenylammonium salt, a quaternary ammonium salt such as a tetramethylammonium salt, a tetraethylammonium salt, and a tetraphenylammonium salt, and the like. These trimerization catalysts may be used singly or in combination of two or more thereof.

When a trimerization catalyst is contained in the polyol composition, the amount of the trimerization catalyst blended is preferably in a range of 1 to 40 parts by mass, more preferably in a range of 2 to 30 parts by mass, further preferably in a range of 3 to 20 parts by mass, and particularly preferably in a range of 4 to 18 parts by mass, with respect to 100 parts by mass of the polyol compound. By adding a trimerization catalyst in the above-described amount blended, the trimerization reaction sufficiently occurs and a uniform foam can be formed.

The trimerization catalyst is preferably included in a range of 0.1 to 15% by mass, more preferably 0.5 to 10% by mass, and further preferably 1 to 8% by mass with respect to the total amount of the polyurethane composition.

<Urethane Catalyst>

Specific examples of the urethane catalyst include a tertiary amine, a tin compound, an acetylacetone metal salt, and the like.

Specific examples of the tertiary amine include pentamethyldiethylenetriamine, triethylamine, N-methylmorpholinbis(2-dimethylaminoethyl) ether, N,N,N',N'',N''-pentamethyldiethylenetriamine, N,N,N'-trimethylaminoethylethanolamine, bis(2-dimethylaminoethyl) ether, N-methyl-N'N'-dimethylaminoethyl piperazine, an imidazole compound in which the secondary amine functional group in the imidazole ring is replaced with a cyanoethyl group, N,N-dimethylcyclohexylamine, diazabicycloundecene, triethylenediamine, tetramethylhexamethylenediamine, N-methylimidazole, trimethylaminoethylpiperazine, tripropylamine, and the like.

Specific examples of the tin compound include dibutyltin diacetate, dibutyltin dilaurate, and the like.

Specific examples of the acetylacetone metal salt include acetylacetone aluminum, acetylacetone iron, acetylacetone copper, acetylacetone zinc, acetylacetone beryllium, acetylacetone chromium, acetylacetone indium, acetylacetone manganese, acetylacetone molybdenum, acetylacetone titanium, acetylacetone cobalt, acetylacetone vanadium, acetylacetone zirconium, and the like.

In a preferred embodiment, the polyol composition of the present invention includes a tertiary amine as a urethane catalyst. As the urethane catalyst, one kind or two or more kinds of tertiary amine, or a combination of two or more kinds composed of a tertiary amine and a urethane catalyst other than that tertiary amine, can be used.

When a urethane catalyst is contained in the polyol composition of the present invention, the amount of the urethane catalyst blended is preferably in a range of 0.5 to 30 parts by mass, more preferably in a range of 1 to 20 parts by mass, further preferably in a range of 1.5 to 15 parts by mass, and particularly preferably in a range of 2 to 12 parts by mass, with respect to 100 parts by mass of the polyol compound. By setting the amount of the urethane catalyst blended to be within the above ranges, a dimerization reaction occurs sufficiently and sufficient heat to cause the trimerization reaction is generated, so that a uniform foam can be formed.

The urethane catalyst is preferably included in a range of 0.1 to 10% by mass, more preferably 0.3 to 8% by mass, and further preferably 0.5 to 5% by mass, with respect to the total amount of the polyurethane composition.

When the polyol composition of the present invention includes a tertiary amine, a carboxylic acid may be further blended for the purpose of adjusting the reaction rate.

Specific examples of the carboxylic acid include aliphatic monocarboxylic acids such as acetic acid, propionic acid, butyric acid, valeric acid, caproic acid, enanthic acid, caprylic acid, pelargonic acid, capric acid, lauric acid, myristic acid, palmitic acid, margaric acid, stearic acid, oleic acid, linoleic acid, linolenic acid, arachidonic acid, docosahexaenoic acid, and eicosapentaenoic acid, an aliphatic polyvalent carboxylic acid such as oxalic acid, malonic acid, succinic acid, glutaric acid, adipic acid, azelaic acid, sebacic acid, fumaric acid, and maleic acid, a hydroxy acid such as lactic acid, malic acid, and citric acid, an aromatic monocarboxylic acid such as benzoic acid, salicylic acid, gallic acid, and cinnamic acid, an aromatic polyvalent carboxylic acid such as phthalic acid, isophthalic acid, terephthalic acid, trimellitic acid, pyromellitic acid, mellitic acid, biphenyldicarboxylic acid, biphenyltetracarboxylic acid, and naphthalenedicarboxylic acid, an oxocarboxylic acid such as pyruvic acid, an anhydride thereof, a mixture thereof, and the like.

When a carboxylic acid is used, the amount of the carboxylic acid blended is preferably 0.02 to 12 parts by mass, and more preferably 0.1 to 2 parts by mass, with respect to 100 parts by mass of the polyol compound.

Further, when a carboxylic acid is used, the content ratio of the carboxylic acid in the composition of the present invention is preferably 0.01 to 6% by mass, and more preferably 0.05 to 1% by mass, with respect to the total amount of the polyurethane composition.

(Foam Stabilizing Agent)

Specific examples of the foam stabilizing agent include a surfactant such as a polyoxyalkylene foam stabilizing agent, for example a polyoxyalkylene alkyl ether, a silicone foam stabilizing agent, for example an organopolysiloxane, and the like. The foam stabilizing agents may be used singly or in combination of two or more thereof.

When a foam stabilizing agent is included in the polyol composition of the present invention, the amount of the foam stabilizing agent blended is preferably in a range of 0.2 to 20 parts by mass, more preferably in a range of 0.5 to 15 parts by mass, and further preferably in a range of 1 to 10 parts by mass, with respect to 100 parts by mass of the polyol compound.

The content ratio of the foam stabilizing agent can be preferably in a range of 0.1 to 10% by mass with respect to the total amount of the polyurethane composition.

(Liquid Flame Retardant)

The polyol composition of the present invention preferably includes, in addition to the solid flame retardant described above, a phosphoric acid ester as a liquid flame retardant. Unlike a powder flame retardant, the liquid flame retardant is not a flame retardant that is present as a solid in the polyol composition, it is a flame retardant that is a liquid at normal temperature and pressure, or a flame retardant that dissolves in the polyol composition at normal temperature and pressure. By containing a phosphoric acid ester as a liquid flame retardant, it is easier to improve fire retardancy without almost any reduction in the miscibility of the polyol composition with the isocyanate.

As the phosphoric acid ester, a monophosphoric acid ester, a condensed phosphoric acid ester, or the like can be used. The monophosphoric acid ester is a phosphoric acid ester having one phosphorus atom in the molecule.

The monophosphoric acid ester is not particularly limited, and examples thereof include trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyldiphenyl phosphate, xylenyldiphenyl phosphate, diphenyl(2-ethylhexyl) phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, dimelamine phosphate, melamine pyrophosphate, triphenylphosphine oxide, tricresyl phosphine oxide, diphenyl methanephosphonate, diethyl phenylphosphonate, resorcinol bis(diphenylphosphate), bisphenol A bis(diphenylphosphate), phosphaphenanthrene, tris(β-chloropropyl)phosphate, and the like.

Examples of the condensed phosphoric acid ester include trialkylpolyphosphate, resorcinolpolyphenyl phosphate, bisphenol A polycresyl phosphate, resorcinol poly(di-2,6-xysilyl)phosphate, hydroquinone poly(2,6-xysilyl)phosphate, and a condensed phosphoric acid ester of a condensate of these.

Commercially available products of the condensed phosphoric acid ester include, for example, "CR-733S", "CR-741", "CR747", and "PX-200", which are manufactured by Daihachi Chemical Industry Co., Ltd., and "Adeka Stub PFR", "FP-600", "FP-700" manufactured by ADEKA, and the like.

Among the above, it is preferable to use a monophosphoric acid ester because it has a high effect of reducing the viscosity of the composition before curing and a high effect of reducing the initial calorific value, and it is more preferable to use tris(β-chloropropyl)phosphate (TMCPP).

The phosphoric acid esters may be used singly or in combination of two or more thereof.

When the polyol composition of the present invention contains a phosphoric acid ester as a liquid flame retardant, the amount of the phosphoric acid ester blended is preferably in a range of 1 to 100 parts by mass, more preferably in a range of 10 to 80 parts by mass, further preferably in a range of 20 to 70 parts by mass, and most preferably in a range of 30 to 60 parts by mass, with respect to 100 parts by mass of the polyol compound. By setting the content ratio of the liquid flame retardant to be not less than lower limit values, it is easier for the effect of containing the liquid flame retardant to be exhibited. Further, by setting the amount of the liquid flame retardant blended to be not more than these upper limit values, foaming of the polyurethane foam is not hindered by the liquid flame retardant.

The polyol composition of the present invention may optionally include, as long as the object of the present invention is not impaired, an additive such as a phenol-based, amine-based, sulfur-based or other antioxidant, an auxiliary component such as a heat stabilizer, a metal damage inhibitor, an antistatic agent, a stabilizer, a crosslinking agent, a lubricant, a softener, a pigment, and a tackifying resin, a tackifier such as polybutene and a petroleum resin, and the like.

The polyol composition of the present invention has a viscosity of preferably 100 to 3,000 mPas, more preferably 300 to 2,000 mPas, and further preferably 500 to 1,500 mPas. By setting the viscosity to within these ranges, the handleability and the like of the polyol composition is excellent. The viscosity is measured using a BM type viscometer under the conditions of a BM3 spindle, a rotation speed of 60 rpm, and a temperature of 25° C.

(Method for Producing Polyol Composition)

The method for producing the polyol composition of the present invention is not particularly limited, and for example, the polyol composition can be produced by stirring each component using a known stirrer such as a homodisper or a planetary stirrer.

[Polyurethane Foam]

In the present invention, a polyurethane foam can be formed from a mixture of the above-described polyol composition and a polyisocyanate. The polyurethane foam of the present invention is a reaction product of the polyol composition of the present invention and a polyisocyanate.

When the polyol composition of the present invention is mixed with a polyisocyanate, a reaction proceeds and the viscosity increases with the passage of time, fluidity is lost and the mixture cures. The reaction between the polyol composition and the polyisocyanate may be carried out at room temperature or by heating.

(Polyisocyanate)

Examples of the polyisocyanate include an aromatic polyisocyanate, an alicyclic polyisocyanate, an aliphatic polyisocyanate, and the like.

Examples of the aromatic polyisocyanate include phenylene diisocyanate, tolylene diisocyanate, xylylene diisocyanate, diphenylmethane diisocyanate, dimethyldiphenylmethane diisocyanate, triphenylmethane triisocyanate, naphthalene diisocyanate, polymethylene polyphenyl polyisocyanate, and the like.

Examples of the alicyclic polyisocyanate include cyclohexylene diisocyanate, methylcyclohexylene diisocyanate, isophorone diisocyanate, dicyclohexylmethane diisocyanate, dimethyldicyclohexylmethane diisocyanate, and the like.

Examples of the aliphatic polyisocyanate include methylene diisocyanate, ethylene diisocyanate, propylene diisocyanate, tetramethylene diisocyanate, hexamethylene diisocyanate, and the like.

A urethane prepolymer may also be used as the polyisocyanate. Examples of the urethane prepolymer include a urethane prepolymer obtained by reacting the above-described polyol compound with the above-described polyisocyanate compound in excess.

Among these, from the viewpoint of ease of use and availability, an aromatic polyisocyanate such as polyphenylpolymethylene polyisocyanate is preferable. One kind of polyisocyanate may be used alone, or two or more kinds may be mixed and used.

Further, the polyisocyanate may appropriately contain a known additive that is blended in the polyisocyanate before being mixed with the polyol composition.

It is preferable that the polyol composition and the polyisocyanate mixed in the polyol composition have substantially the same volume. Specifically, a volume ratio of the polyisocyanate with respect to the polyol composition is preferably 0.8 to 1.2, more preferably 0.9 to 1.1, and further preferably 0.95 to 1.05.

(Isocyanate Index)

The isocyanate index of the polyurethane foam of the present invention is not particularly limited, and is preferably 200 or more. When the isocyanate index is equal to or more than this lower limit value, the amount of polyisocyanate with respect to the polyol is in excess, so that isocyanurate bonds due to a polyisocyanate trimer tend to form, and as a result the fire retardancy of the polyurethane foam is improved. Further, when the isocyanate index is equal to or more than this lower limit value, it is easier to produce a polyurethane foam having isocyanurate bonds, that is a polyurethane foam that combines a high level of fire retardancy with a high level of thermal insulation. From these viewpoints, the isocyanate index is more preferably 260 or more, further preferably 280 or more, and particularly preferably 300 or more.

Further, the isocyanate index is preferably 700 or less, more preferably 600 or less, and further preferably 500 or less. When the isocyanate index is equal to or less than these upper limit values, the balance between the fire retardancy of the obtained polyurethane foam and the production cost is good.

The isocyanate index can be calculated by the following method.

Isocyanate index=equivalent amount of isocyanate÷
(equivalent amount of polyol+equivalent
amount of water)×100

Here, each of the equivalent amounts can be calculated as follows.

Equivalent amount of isocyanate=amount of polyiso-
cyanate used(g)×NCO content (% by mass)
÷100/molecular weight of NCO (mol)

Equivalent amount of polyol=OHV×amount of
polyol used(g)÷molecular weight of KOH(m-
mol)

OHV is the hydroxyl value (mgKOH/g) of the polyol.

Equivalent amount of water=amount of water used
(g)/molecular weight of water(mol)×number of
OH groups of water In each of the above formulas, the molecular weight of NCO is 42 (mol), the molecular weight of KOH is 56,100 (mmol), the molecular weight of water is 18 (mol), and the number of OH groups of water is 2.

(Method for Producing Polyurethane Foam)

There are no particular restrictions on the method for producing the polyurethane foam of the present invention. For example, the polyol composition of the present invention and a polyisocyanate can be mixed, and the mixture injected into a container, such as a mold, and cured to obtain a polyurethane foam. Alternatively, the polyol composition of the present invention and a polyisocyanate can be sprayed onto a structure to be coated and cured to obtain a polyurethane foam.

From the viewpoint of ease of handling, the specific gravity of the polyurethane foam of the present invention is preferably in a range of 0.020 to 0.130, more preferably in a range of 0.020 to 0.100, and further preferably in a range of 0.030 to 0.080, and particularly preferably in a range of 0.030 to 0.060.

(Use of Polyurethane Foam)

The polyurethane foam of the present invention can be formed into a thin panel and placed in structures such as buildings, furniture, automobiles, trains, and ships. Alternatively, the polyol composition of the present invention and a polyisocyanate can be sprayed onto those structures to form a polyurethane foam layer on the surface of the structure.

EXAMPLES

The present invention will now be described in more detail with reference to the following examples, but the present invention is not limited thereto.

The methods for measuring the SiOH ratio and the water absorption amount performed in the examples, and the methods for evaluating the polyol composition are as follows.

[SiOH Ratio]

The total count number of all ions and the count number of SiOH ions on the surface of the metal oxide fine particle were measured using a time-of-flight secondary ion mass spectrometer (TOF-SIMS5 manufactured by ION-TOF), and the SiOH ratio of the metal oxide fine particle was calculated as the ratio of the count number of SiOH ions to the total count number of all ions. The analysis conditions for the TOF-SIMS were as follows.

Primary ion: $^{209}Bi^{3++}$
Ion voltage: 25 kV
Pulse current value: 1 pA
Mass range: 1 to 500 mass
Charge prevention: Electron irradiation neutralization (using flood gun)

[Water absorption amount] 1 g of the metal oxide fine particle was placed in an oven maintained at 20° C. and a humidity of 85% RH, and the weight increase after 60 minutes was measured to calculate the weight increase ratio. When the weight increase ratio was 0.01% or less, the measurement error is large, and therefore such cases are denoted as <0.01.

[Caking] Each of the components other than the foaming agent shown in Table 2 was charged into a 500 ml plastic container, and stirred with a small stirrer at 3,000 rpm for 5 minutes. Then, the foaming agent was added, and the mixture was stirred at 3,000 rpm for 1 minute. 200 g of the obtained sample (polyol composition) was charged into a 300 ml mayonnaise bottle manufactured by Tokyo Garasu Kikai Co., Ltd., and stored in an oven maintained at 40° C. The sample was taken out after one month, and a medicine spoon was gently lowered therein. Cases in which the medicine spoon reached the bottom of the plastic container by its own weight were evaluated as "Good", and cases in which the spoon hit a hard layer on the way and did not reach the bottom of the plastic container were evaluated as "Bad".

[Viscosity] The viscosity of the polyol composition was measured using a BM type viscometer under the conditions of a BM3 spindle, a rotation speed of 60 rpm, and a temperature of 25° C.

Examples 1 to 19 and Comparative Examples 1 to 2

In each example and comparative example, a polyol composition was prepared according to the blend shown in Table 1. The evaluation results of the obtained polyol compositions are shown in Table 2.

TABLE 1

| Polyol | A-1 | p-phthalic acid polyester polyol (Maximol RLK-087, manufactured by Kawasaki Kasei Chemicals, hydroxyl value = 200 mgKOH/g) |
|---|---|---|
| Foaming agent | HFO | trans-1-chloro-3,3,3-trifluoropropene (manufactured by Honeywell, product name: Solstice LBA) |
| | Water | |
| | HFC | 1,1,1,3,3-pentafluorobutane (HFC365mfc, manufactured by Central Glass Co., Ltd.) 1,1,1,3,3-pentafluoropropane (HFC245fa, manufactured by Nippon Solvay) mixing ratio: HFC365mfc:HFC245fa = 7:3 |

TABLE 1-continued

| | | |
|---|---|---|
| Filler | B-1 | ammonium polyphosphate (Exolit AP422, manufactured by Clariant Chemicals) |
| | B-2 | carbon black (manufactured by Mitsubishi Carbon Black) |
| | B-3 | silicon-based acicular filler (SH1250, manufactured by Kinsei Matec) |
| | B-4 | red phosphorous (Nova Excel 140, manufactured by Rin Kagaku Kogyo) |
| | B-5 | calcium carbonate (BF300, manufactured by Shiraishi Calcium) |
| Metal oxide fine particle | C-1 | hydrophobic treated silicon oxide fine particle (AEROSIL R976S, manufactured by Aerosil Japan, specific surface area 300 g/m$^2$, average primary particle size approximately 7 nm, hydrophobic group: dimethylsilyl, SiOH ratio = 0.067) |
| | C-2 | hydrophobic treated silicon oxide fine particle (AEROSIL RY-300, manufactured by Aerosil Japan, specific surface area 300 g/m$^2$, average primary particle size approximately 7 nm, hydrophobic group: dimethylpolysiloxane, SiOH ratio = 0.017) |
| | C-3 | hydrophobic treated silicon oxide fine particle (AEROSIL RA200H, manufactured by Aerosil Japan, specific surface area 200 g/m$^2$, average primary particle size approximately 12 nm, hydrophobic group: trimethylsilyl, hydrophilic group: amino, SiOH ratio = 0.073) |
| | C-4 | hydrophobic treated silicon oxide fine particle (AEROSIL RX300, manufactured by Aerosil Japan, specific surface area 300 g/m$^2$, average primary particle size approximately 7 nm, hydrophobic group: trimethylsilyl, SiOH ratio = 0.066) |
| | C-5 | hydrophobic treated silicon oxide fine particle (AEROSIL R976, manufactured by Aerosil Japan, specific surface area 300 g/m$^2$, average primary particle size approximately 7 nm, hydrophobic group: dimethylsilyl, SiOH ratio = 0.079) |
| | C-6 | silicon oxide fine particle (AEROSIL 300, manufactured by Aerosil Japan, specific surface area 300 g/m$^2$, average primary particle size approximately 7 nm, hydrophobic group: none, SiOH ratio = 0.140) |
| Trimerization catalyst | D-1 | potassium 2-ethylhexanoate (K-zeroG, manufactured by MOMENTIVE) |
| | D-2 | trimerization catalyst (TOYOCAT-TRX, manufactured by Tosoh Corporation) |
| Urethane catalyst | E-1 | foaming catalyst (TOYOCAT-TT, manufactured by Tosoh Corporation) |
| | E-2 | resinification catalyst (TOYOCAT-DM70, manufactured by Tosoh Corporation) |
| Foam stabilizing agent | F-1 | polyalkylene glycol-based foam stabilizing agent (SH-193, manufactured by Dow Corning Toray) |
| Liquid flame retardant | G-1 | phosphoric acid ester (TMCPP, manufactured by Daihachi Chemical) |

The HFC used as the foaming agent shown in Table 1 is a hydrofluorocarbon, and the HFO is a hydrofluoroolefin.

TABLE 2

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Polyol | A-1 | 100 | 100 | 100 | 100 | 100 | 100 | 100 | 100 | 100 | 100 | 100 |
| Foaming agent | HFO | 44.8 | 44.8 | 44.8 | 44.8 | 44.8 | 44.8 | 44.8 | 44.8 | 44.8 | 44.8 | 44.8 |
| | Water | 0.9 | 0.9 | 0.9 | 0.9 | 0.9 | 0.9 | 0.9 | 0.9 | 0.9 | 0.9 | 0.9 |
| | HFC | — | — | — | — | — | — | — | — | — | — | — |
| Filler | B-1 | 44.8 | — | — | — | — | 44.8 | 44.8 | 44.8 | 44.8 | 22.4 | 67.2 |
| | B-2 | — | 44.8 | — | — | — | — | — | — | — | — | — |
| | B-3 | — | — | 44.8 | — | — | — | — | — | — | — | — |
| | B-4 | — | — | — | 44.8 | — | — | — | — | — | — | — |
| | B-5 | — | — | — | — | 44.8 | — | — | — | — | — | — |
| Metal oxide fine particle | C-1 | 2.8 | 2.8 | 2.8 | 2.8 | 2.8 | — | — | — | — | 2.8 | 2.8 |
| | C-2 | — | — | — | — | — | 2.8 | — | — | — | — | — |
| | C-3 | — | — | — | — | — | — | 2.8 | — | — | — | — |
| | C-4 | — | — | — | — | — | — | — | 2.8 | — | — | — |
| | C-5 | — | — | — | — | — | — | — | — | 2.8 | — | — |
| | C-6 | — | — | — | — | — | — | — | — | — | — | — |
| Trimerization catalyst | D-1 | 3.7 | 3.7 | 3.7 | 3.7 | 3.7 | 3.7 | 3.7 | 3.7 | 3.7 | 3.7 | 3.7 |
| | D-2 | 11.2 | 11.2 | 11.2 | 11.2 | 11.2 | 11.2 | 11.2 | 11.2 | 11.2 | 11.2 | 11.2 |
| Urethane catalyst | E-1 | 3.7 | 3.7 | 3.7 | 3.7 | 3.7 | 3.7 | 3.7 | 3.7 | 3.7 | 3.7 | 3.7 |
| | E-2 | 3.7 | 3.7 | 3.7 | 3.7 | 3.7 | 3.7 | 3.7 | 3.7 | 3.7 | 3.7 | 3.7 |
| Foam stabilizing agent | F-1 | 6.3 | 6.3 | 6.3 | 6.3 | 6.3 | 6.3 | 6.3 | 6.3 | 6.3 | 6.3 | 6.3 |
| Liquid flame retardant | G-1 | 44.8 | 44.8 | 44.8 | 44.8 | 44.8 | 44.8 | 44.8 | 44.8 | 44.8 | 44.8 | 44.8 |
| Water absorption amount (% by mass) | | <0.01 | <0.01 | <0.01 | <0.01 | 0.3 | <0.01 | <0.01 | <0.01 | 0.3 | <0.01 | <0.01 |
| Caking | | Good | Good | Good | Good | Good | Good | Good | Good | Good | Good | Good |
| Viscosity (mPas) | | 1300 | 1250 | 2100 | 1300 | 1200 | 2700 | 1000 | 2230 | 700 | 1100 | 1500 |

TABLE 2-continued

|  |  | Example 12 | Example 13 | Example 14 | Example 15 | Example 16 | Example 17 | Example 18 | Example 19 | Comparative Example 1 | Comparative Example 2 |
|---|---|---|---|---|---|---|---|---|---|---|---|
| Polyol | A-1 | 100 | 100 | 100 | 100 | 100 | 100 | 100 | 100 | 100 | 100 |
| Foaming agent | HFO | 44.8 | 44.8 | 44.8 | 44.8 | 44.8 | 44.8 | 44.8 | 44.8 | 44.8 | — |
|  | Water | 0.9 | 0.9 | 0.9 | 0.9 | 0.9 | 0.9 | 0.9 | 0.9 | 0.9 | 0.9 |
|  | HFC | — | — | — | — | — | — | — | — | — | 44.8 |
| Filler | B-1 | — | — | 44.8 | 44.8 | — | — | 44.8 | 44.8 | 44.8 | 44.8 |
|  | B-2 | — | — | — | — | — | — | — | — | — | — |
|  | B-3 | — | — | — | — | — | — | — | — | — | — |
|  | B-4 | 22.4 | 67.2 | — | — | 44.8 | 44.8 | — | — | — | — |
|  | B-5 | — | — | — | — | — | — | — | — | — | — |
| Metal oxide fine particle | C-1 | 2.8 | 2.8 | 4.2 | 1.4 | 4.2 | 1.4 | 2.8 | 2.8 | — | 2.8 |
|  | C-2 | — | — | — | — | — | — | — | — | — | — |
|  | C-3 | — | — | — | — | — | — | — | — | — | — |
|  | C-4 | — | — | — | — | — | — | — | — | — | — |
|  | C-5 | — | — | — | — | — | — | — | — | — | — |
|  | C-6 | — | — | — | — | — | — | — | — | 2.8 | — |
| Trimerization catalyst | D-1 | 3.7 | 3.7 | 3.7 | 3.7 | 3.7 | 3.7 | 3.7 | 3.7 | 3.7 | 3.7 |
|  | D-2 | 11.2 | 11.2 | 11.2 | 11.2 | 11.2 | 11.2 | 11.2 | 11.2 | 11.2 | 11.2 |
| Urethane catalyst | E-1 | 3.7 | 3.7 | 3.7 | 3.7 | 3.7 | 3.7 | 3.7 | 3.7 | 3.7 | 3.7 |
|  | E-2 | 3.7 | 3.7 | 3.7 | 3.7 | 3.7 | 3.7 | 3.7 | 3.7 | 3.7 | 3.7 |
| Foam stabilizing agent | F-1 | 6.3 | 6.3 | 6.3 | 6.3 | 6.3 | 6.3 | 6.3 | 0 | 6.3 | 6.3 |
| Liquid flame retardant | G-1 | 44.8 | 44.8 | 44.8 | 44.8 | 44.8 | 44.8 | 0 | 44.8 | 44.8 | 44.8 |
| Water absorption amount (% by mass) |  | <0.01 | <0.01 | <0.01 | <0.01 | <0.01 | <0.01 | <0.01 | <0.01 | 2.0 | <0.01 |
| Caking |  | Good | Good | Good | Good | Good | Good | Good | Good | Bad | Bad |
| Viscosity (mPas) |  | 1250 | 1500 | 2600 | 800 | 2600 | 850 | 2400 | 1400 | 400 | 400 |

The units of the amount of each component in the polyol compositions blended shown in Table 2 are parts by mass.

The polyol composition of each example contained a metal oxide fine particle having a SiOH ratio of 0.1 or less, and therefore could be used by re-stirring without hard caking occurring even after long-term storage. In contrast, in Comparative Example 1, in which a metal oxide fine particle having a SiOH ratio of more than 0.1 was used, and Comparative Example 2, in which a hydrofluoroolefin was not used as a foaming agent, hard caking occurred in the polyol composition.

The invention claimed is:

1. A polyol composition comprising a polyol compound, a foaming agent, a filler, and a metal oxide fine particle, wherein:
   the foaming agent comprises a hydrofluoroolefin,
   the metal oxide fine particle has a count number ratio of OH ions of a metal constituting the metal oxide fine particle with respect to a total count number of all ions measured using time-of-flight secondary ion mass spectrometry of 0.1 or less, and
   the metal oxide fine particle comprises a hydrophobic group on a surface.

2. The polyol composition according to claim 1, further comprising at least one selected from the group consisting of a catalyst and a foam stabilizing agent.

3. The polyol composition according to claim 1, wherein the filler comprises a powder flame retardant.

4. The polyol composition according to claim 1, wherein the filler comprises an inorganic filler.

5. The polyol composition according to claim 1, wherein the filler comprises a pigment.

6. The polyol composition according to claim 1, wherein a metal portion of the metal oxide fine particle is at least one selected from the group consisting of aluminum, titanium, zirconium, and silicon.

7. The polyol composition according to claim 1, wherein the metal portion of the metal oxide fine particle is silicon.

8. A polyurethane foam, which is a reaction product of the polyol composition according to claim 1 and a polyisocyanate.

9. The polyol composition according to claim 1, wherein the hydrophobic group is at least one selected from the group consisting of an alkylsilane and an amino group.

10. The polyol composition according to claim 9, wherein the alkylsilane is selected from the group consisting of dimethylsilyl, trimethylsilyl, dimethylpolysiloxane, aminoalkylsilyl, methacrylsilyl, and octylsilyl.

11. The polyol composition according to claim 1, wherein the hydrofluoroolefin is at least one selected from the group consisting of a trifluoropropene, a tetrafluoropropene, a pentafluoropropene, a chlorotrifluoropropene, a chlorodifluoropropene, a chlorotrifluoropropene, and a chlorotetrafluoropropene.

12. The polyol composition according to claim 1, wherein the hydrofluoroolefin is at least one selected from the group consisting of 1,3,3,3-tetrafluoropropene (HFO-1234ze), 1,1,3,3-tetrafluoropropene, 1,2,3,3,3-pentafluoropropene (HFO-1225ye), 1,1,1-trifluoropropene, 1,1,1,3,3-pentafluoropropene (HFO-1225zc), 1,1,1,3,3,3-hexafluorobut-2-ene, 1,1,2,3,3-pentafluoropropene (HFO-1225yc), 1,1,1,2,3-pentafluoropropene (HFO-1225yez), 1-chloro-3,3,3-trifluoropropene (HFO-1233zd), and 1,1,1,4,4,4-hexafluorobut-2-ene.

13. The polyol composition according to claim 1, wherein the hydrofluoroolefin is a hydrochlorofluoroolefin.

14. The polyol composition according to claim 13, wherein the hydrochlorofluoroolefin is trans-1-chloro-3,3,3-trifluoropropene.

* * * * *